(12) United States Patent
Erikson et al.

(10) Patent No.: US 6,422,101 B2
(45) Date of Patent: Jul. 23, 2002

(54) REINFORCED LEAD SCREW WITH SPRINGLESS ANTI-BACKLASH NUT

(75) Inventors: Keith W. Erikson, Hollis; Kenneth W. Erikson, Amherst, both of NH (US)

(73) Assignee: Kerk Motion Products, Inc., Hollis, NH (US)

( * ) Notice: Subject to any disclaimer, the term of this patent is extended or adjusted under 35 U.S.C. 154(b) by 0 days.

(21) Appl. No.: 09/812,058

(22) Filed: Mar. 19, 2001

Related U.S. Application Data

(63) Continuation-in-part of application No. 09/336,905, filed on Jun. 21, 1999, now Pat. No. 6,202,500, which is a continuation-in-part of application No. 08/842,849, filed on Apr. 17, 1997, now Pat. No. 5,913,941.

(51) Int. Cl.[7] .............................................. F16H 27/02
(52) U.S. Cl. .................................... 74/89.42; 74/424.72
(58) Field of Search .......................... 74/89.42, 424.71, 74/424.72

(56) References Cited

U.S. PATENT DOCUMENTS

| | | | |
|---|---|---|---|
| 3,372,605 A | 3/1968 | Orner | 74/459 |
| 4,131,031 A | 12/1978 | Erikson et al. | 74/441 |
| RE31,713 E | 10/1984 | Erikson et al. | 74/441 |
| 4,566,345 A | 1/1986 | Erikson et al. | 74/89.15 |
| 4,872,795 A | * 10/1989 | Davis | 411/432 |
| 5,079,963 A | 1/1992 | Yamamoto et al. | 74/89.15 |
| 5,689,997 A | 11/1997 | Schaller | 74/335 |
| 5,732,596 A | 3/1998 | Erikson et al. | 74/441 |
| 5,761,960 A | 6/1998 | Nagai et al. | 74/89.15 |
| 5,852,949 A | 12/1998 | Cartensen | 74/424.8 A |
| 5,913,941 A | 6/1999 | Erikson et al. | 74/459 |
| 5,937,702 A | 8/1999 | Erikson et al. | 74/459 |
| 6,142,032 A | * 11/2000 | Creager | 74/441 |
| 6,202,500 B1 | 3/2001 | Erikson et al. | 74/459 |

FOREIGN PATENT DOCUMENTS

| | | |
|---|---|---|
| EP | 0 529 563 A2 | 3/1903 |
| EP | 0 559 441 A1 | 9/1993 |
| EP | 0 577 390 A2 | 1/1994 |

\* cited by examiner

Primary Examiner—David Fenstermacher
(74) Attorney, Agent, or Firm—Hamilton, Brook, Smith & Reynolds, P.C.

(57) ABSTRACT

An anti-backlash nut assembly is on a reinforced lead screw having a threaded lead screw rotatable about a central axis. A hollow, elongated reinforcing rail extends lengthwise of and surrounding the lead screw. The reinforcing rail has a slot extending lengthwise of the central axis. The anti-backlash nut assembly has a nut moveable along the reinforcing rail. The anti-backlash nut has a pair of separate nut portions. Each nut portion has a tongue extending radially through the slot and having threads engagable with the threads of the lead screw for moving both nut portions in reciprocating motion lengthwise of the rail when the screw is rotated. A spacing mechanism forces the nut portions apart to urge the flanges of their threads into forcible engagement with the threads of the lead screw to prevent backlash while the anti-backlash nut translates laterally along the reinforcing rail.

10 Claims, 3 Drawing Sheets

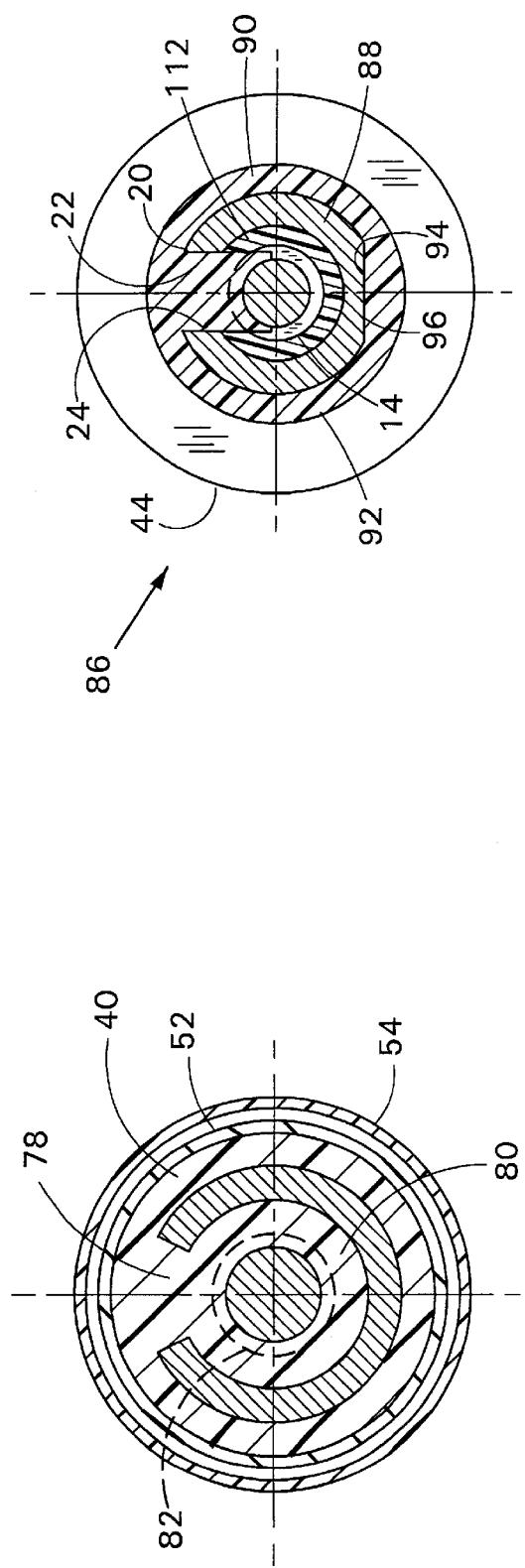
FIG. 5
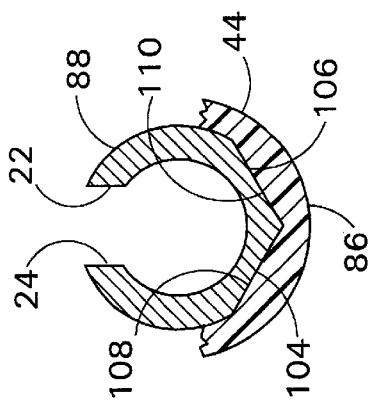
FIG. 7
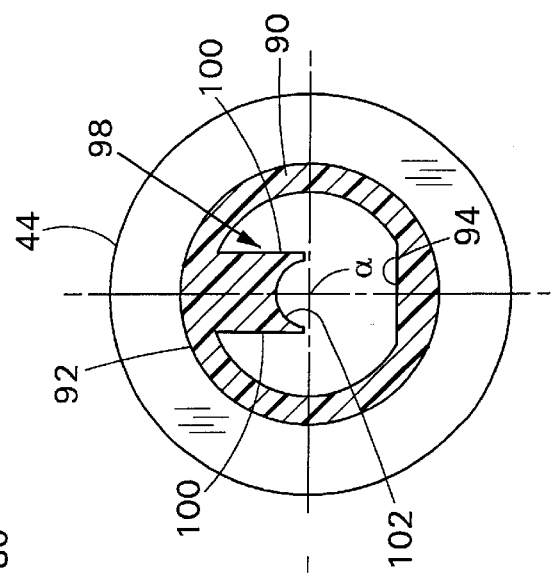
FIG. 6
FIG. 4

REINFORCED LEAD SCREW WITH SPRINGLESS ANTI-BACKLASH NUT

RELATED APPLICATIONS

This application is a Continuation-in-Part of application Ser. No. 09/336,905 filed Jun. 21, 1999, now U.S. Pat. No. 6,202,500, which is a Continuation-in-Part of 08/842,849 filed Apr. 17, 1997 now U.S. Pat. No. 5,913,941, the contents of the which are incorporated herein by reference in their entirety.

BACKGROUND OF THE INVENTION

U.S. Pat. No. 4,566,345, issued Jan. 26, 1986 to the present inventors and disclosed a carrier for mounting a tool for reciprocating motion along a pair of spaced, parallel guide rails. The carrier itself is reciprocated bilaterally by a rotating lead screw extending lengthwise between and parallel to the guide rails. The lead screw engages an internally threaded nut on the carrier. The nut may be an anti-backlash nut and will be so illustrated hereinafter. With the lead screw located between the rails, there are bearing supports extending laterally from the carrier, each mounting a bearing which slides on a guide rail much in the manner of outrigger pontoons.

The rails serve a number of purposes. They create a low-friction guideway for the carrier to ride on but, more importantly, they create an anti-rotation mechanism for the carriage. If there were no guide rails and the carrier were mounted on the lead screw only, the carrier probably would not reciprocate. This is because the mass of the carrier would create high frictional resistance between its threaded nut and the lead screw such that the carrier would rotate with the lead screw rather than traversing it. Secondly, again, if there were no guide rails and if the lead screw were oriented in a horizontal direction, the flexure of the lead screw, created by the weight of the carrier and the tool that it mounts, could cause the carrier to bind on the lead screw and/or cause the tool that it mounts to disengage from its workpiece.

Yet another problem can exist. Tools mounted on the carrier are normally offset from the central axis of the lead screw. In addition, the tools are mounted on posts in a cantilevered position relative to the carrier. Normal drag of the tool relative to its workpiece creates a torque which is imparted through the tool post to the carrier and, hence, to the supports riding on the rails which carry the bearings. This can cause unnecessary drag, monkey-biting, or can conceivably result in the lead screw's driving motor to stall out.

Another shortcoming in certain applications where space is limited is the size of the mechanism. Two guide rails spaced laterally of a lead screw creates a drive mechanism which is spread out, generally horizontally, and, in some machine operations, there is not sufficient space to do this. In addition, it is difficult to obtain initial alignment of the screw and two parallel rails.

It is to the solution of these problems that the present invention is directed.

SUMMARY OF THE INVENTION

The invention resides in a reinforced lead screw assembly which includes a threaded lead screw rotatable about a central axis by a reversible motor. Surrounding the lead screw is a rigid, hollow, elongated reinforcing rail or tube which extends lengthwise end to end of the screw. A two-part anti-backlash nut is movable along the reinforcing rail and is driven by the screw. There is a slot in the reinforcing rail which extends lengthwise of the central axis of the lead screw. Projections or tongues on both portions of the nut extend in a radial direction through the slot in the reinforcing rail and are engagable with the walls of the slot to prevent rotation of the anti-backlash nut relative to the rail. The tongues or projections mount threads which are engagable with the threads of the lead screw. Consequently, when the lead screw is rotated in either direction, the nut will translate lengthwise of the screw.

The projections on the nut portions have either partial threads engagable with the threads of the lead screw or mounted circular hubs which are internally threaded to engage the lead screw.

The reinforcing rail may include at least one flat extending lengthwise which is engagable with mating flats on the nut portion to supplement the anti-rotation function of the tongue and the slot in the rail to prevent the nut from rotating relative to the reinforcing rail. The outer surface of the reinforcing rail may be coated with a low-friction material such as PTFE, Nylon or the like. The anti-backlash nut also may be made of self-lubricating material such as acetyl and may include PTFE carbon fiber additive or other lubricating additives for low frictional engagement with the lead screw. It may be molded around or attached to a ball bushing for added stiffness and lubricity. The sleeve bearing located within the lead screw may be made of Nylon, Delrin or like plastic material.

A spacing mechanism such as an advancing collar positions and retains the nut halves or portions apart so that the flanks of their threads are in contact with the flanks of the threads of the lead screw to prevent backlash while the nut translates laterally along the reinforcing rail in both directions.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4 is a sectional view through the reinforced guide rail and the nut-bearing taken along the line 4—4 on FIG. 2;

FIG. 5 is a sectional view through an alternative nut-bearing with the lead screw and the reinforcing rail;

FIG. 6 is a view similar to FIG. 5 with the lead screw and the reinforcing rail removed and having one flat on the nut-bearing; and FIG. 7 is a schematic sectional view of part of the guide rail and the nut-bearing illustrating another embodiment of the flats.

DETAILED DESCRIPTION OF THE INVENTION

Figure 1:
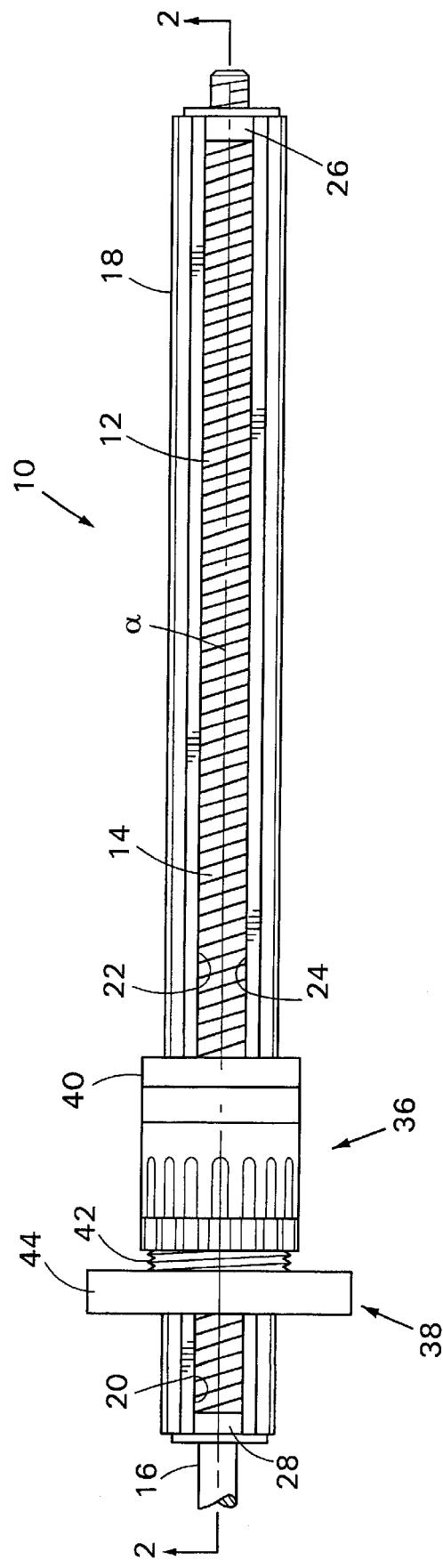
FIG. 1 is a plan view of a reinforced lead screw embodying the present invention.

Referring to the drawings, where like numerals indicate like elements, there is illustrated a reinforced lead screw in accordance with the present invention, generally referred to as 10.

The reinforced lead screw 10 is seen assembled in plan view in FIG. 1. The reinforced lead screw 10 includes a screw 12, a lead screw, rotatable about an axis α and having threads 14 formed along its length. A projection 16 is formed on one end of the lead screw 12 to connect it to a reversible driving motor (not shown) in order to rotate the lead screw 12 alternatively in clockwise and counterclockwise direction.

The reinforced lead screw 10 has surrounding the lead screw 12, an elongated reinforcing rail 18 or tube which extends lengthwise of the screw 12. The reinforcing rail 18 is hollow to accommodate the lead screw and includes a slot 20 extending lengthwise and parallel to the central axis α of the lead screw 12. The slot 20 includes side walls 22 and 24, as seen also in FIG. 3, which may constitute bearing surfaces as will be explained in further detail hereinafter. The lead screw 12 is journaled within the reinforcing rail 18 by bearings 26 and 28 for rotation relative to the reinforcing rail 18.

The reinforced lead screw 10 can have an elongated sleeve bearing extending lengthwise of the reinforcing rail. The bearing can be made of a low-friction plastic such as PTFE, Nylon or Delrin and has a circular interior and engages the threads of the lead screw. It functions as a radial support for the lead screw preventing the screw from whipping or vibrating as it is rotated. An elongated sleeve bearing is described in U.S. patent application Ser. No. 09/336,905 filed on Jun. 21, 1999 which is incorporated by reference in its entirety.

In operation, the reinforcing guide rail 18 would be secured in a machine structure by any convenient means (not shown) with a reversible driving motor attached to the lead screw 12.

An anti-backlash nut, generally indicated 36, which may be metal or, preferably, moldable plastic such as acetyl with carbon fiber additives is movable in bilateral direction along the reinforcing rail 18. The anti-backlash nut 36 includes a pair of separated nut halves 38 and 40. The nut half 38 has a cylindrical sleeve portion 42 and a larger diameter flange portion 44. The flange 44 may also be called a face plate. The flange 44 is illustrated as circular but may be constructed in any convenient shape depending on the tool or load to be attached. The load with the anti-backlash nut 36 is reciprocated back and forth by the reinforced lead screw 10.

Figures 2, 3:
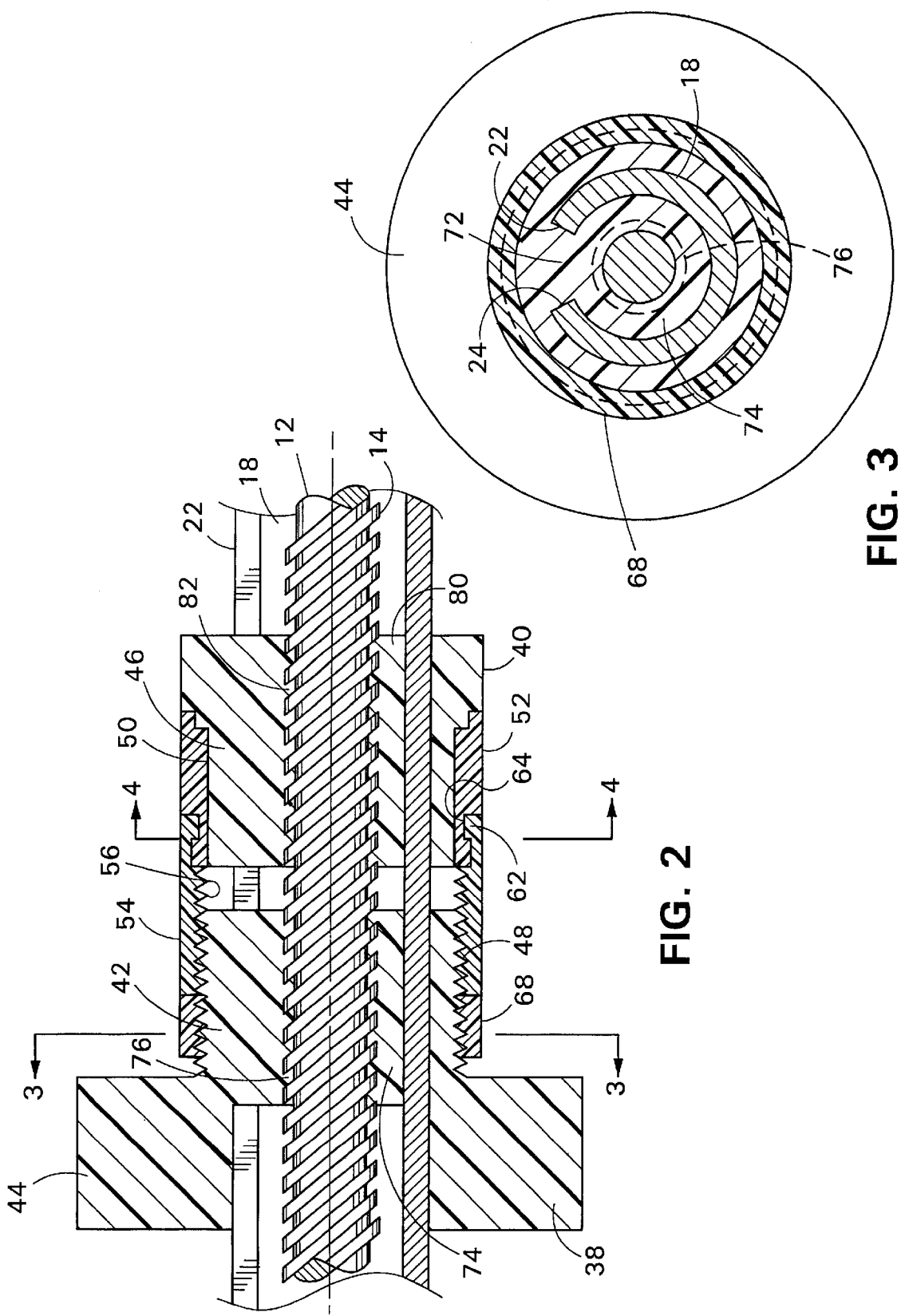
FIG. 2 is a partial sectional view taken along the line 2—2 on FIG. 1.
FIG. 3 is a sectional view through the reinforced guide rail and the nut-bearing taken along the line 3—3 on FIG. 2.

Referring to FIG. 2, the cylindrical sleeve portion 42 of the nut half 38 has an outer surface 48 which is threaded. The other nut half, nut half 40 has a cylindrical sleeve portion 46 with an outer surface 50. A portion of the outer surface 50 is encircled by a slip collar 52, which is rotatable relative to the nut half 40. The antibacklash nut 36 has an advancing collar 54 that has an interior surface 56 which is threaded to be received by the threaded outer surface 48 of the nut half 38.

The advancing collar 54 and the slip collar 52 are rotatably interlocked by each having an interlocking projection 62 received in an annular groove 64 in the other collar 52 and 54. The advancing collar 54 is rotated on the threaded outer surface 48 of the nut half 38 to position or space the nut halves 38 and 40. The anti-backlash nut 36 has a lock nut 68 that has a threaded interior surface which is received by the threaded outer surface 48 of the nut half 38. The lock nut 68 abuts the advancing collar 54 as described below.

Referring to FIGS. 2 and 3, where FIG. 3 is a sectional view of nut half 38, the nut half 38 includes a tongue 72 extending radially downward from the cylindrical sleeve portion 42 and inwardly, engaging the sidewalls 22 and 24 of the reinforcing rail 18. A circular hub 74 is formed on the tongue 72 and has a plurality of internal threads 76 which are in mating engagement with the threads 14 of the lead screw 12. While longitudinal movement is imparted to the nut half 38 by rotation of the lead screw 12, engagement of the tongue 72 with the sides 22 and 24 of the slot 20 in the reinforcing rail 18 prevents the nut half from rotating. The lock nut 68 is shown encircling the cylindrical sleeve portion 42.

Referring to FIGS. 2 and 4, the nut half 40 is constructed in a similar fashion. The nut half 40 has a tongue 78 depending from the cylindrical sleeve portion 46 to a central hub 80 formed on the tongue 78. The central hub 80 has the internal threads 82 which are in mating engagement with the threads 14 of the lead screw 12. As with the tongue 72, rotation of the nut half 40 is prevented by the tongue 78 engaging the sides or walls 22 and 24 of the slot 20 of the lead screw 12.

Referring back to FIG. 2, the nut halves 38 and 40 are positioned so that they are urged in opposite directions by the advancing collar 54 so that the threads 76 and 82 of the nut halves engage the flanks of the threads 14 of the lead screw 12 which faces the other nut half. The positioning and retaining the threads 76 and 82 of the nut halves 38 and 40 into firm engagement with the flanks of the threads 14 of the lead screw 10 prevents backlash while the anti-backlash nut translates bilaterally along the reinforcing rail 18. A further description of the anti-backlash contact is described in reissued Patent No. 31,713 issued on Oct. 30, 1984 and patent application No. 09/336,905 filed on Jun. 21, 1999 which are incorporated by reference in their entirety.

To use the anti-backlash feature of the anti-backlash nut 36, the user rotates the lock nut 68 away from the advancing collar 54 on the cylindrical sleeve portion 44 of the nut half 38. The advancing collar 54 is then rotated to move the advancing collar 54 lateral relative to the nut half 38 and move the nut halves 38 and 40 apart until the threads 76 and 82 of the nut halves 38 and 40 are in firm engagement with the flanks of the threads 14 of the lead screw 10. The lock nut 68 is then rotated into engagement with the advancing collar 54 to prevent rotation of the advancing collar 54.

The user can periodically move the lock nut 68 away from the advancing collar 54 and rotate the advancing collar 54 further apart to compensate for wear of the threads 76 and 82 of the nut halves 38 and 40. The lock nut 68 is then rotated into engagement with the advancing collar 54 to prevent rotation of the advancing collar 54.

The slip collar 52 is an interposed connection between the nut half 40 and the advancing collar 54 in the embodiment shown for ease of manufacturing. It is recognized that the advancing collar 54 can be attached in a rotatable manner directly to the nut half 40.

Referring to FIGS. 5 and 6, an alternative anti-backlash nut 86 and an alternative reinforcing rail 88 are shown. The nut halves 90 of the anti-backlash nut 86 have an optional internal flat 94 on the cylindrical sleeve portion 92. The internal flat 94 is engagable with an optional mating flat 96 formed on the bottom of the reinforcing rail 88, as seen in FIG. 5.

The anti-backlash nut 86 includes a projecting portion or tongue 98 extending radially inward. The tongue 98 has parallel sides 100 which are engagable with the sides 22 and 24 of the aligned slots 20 formed in the guide rail 18. This engagement also assures that, in addition to the functioning of flats 46, 48, the nut will not rotate relative to the guide rail 18 when the lead screw is rotated.

In contrast to the previous embodiment, the tongue 98 does not have a cylindrical sleeve portion but rather a plurality of arcuate threads 102, as seen in FIG. 6, at the innermost end of the projection 98. The threads are engagable with the threads 14 of the lead screw 12 such that when the lead screw is rotated, either clockwise or counterclockwise, the anti-backlash nut 86 will translate relative to the reinforcing rail 88. Functionally, the FIGS. 5 and 6 embodiment of the nut operates in the same manner as the FIGS. 1–4 embodiment. As seen in FIG. 7, a plurality of flats 104 and 106 (hereinafter illustrated as only 2) may be formed in the nut bearing 86 which are engagable with mating flats 108 and 110 on the reinforcing rail 88.

The purpose of the optional flats 104, 106, 108, and 110, be there one or a plurality, is to supplement the autorotational function of the tongue 98 and the slots 20 preventing the nut 36 from rotating relative to the reinforcing rail 18 when the lead screw 12 is rotated. This could be the case where the frictional engagement between the threads of the lead screw and the nut is greater than the frictional engagement between the nut and the exterior of the guide rail.

Referring to FIG. 5, an elongated sleeve bearing 112 is shown within the reinforced rail 88. The bearing can be made of a low-friction plastic such as PTFE, Nylon or Delrin and has a circular interior and engages the threads of the lead screw.

With the present invention, there is no need for lateral guide rails for the nut, or if a carriage is attached, to ride on, since the reinforcing rail 18 is generally sufficient except in very large tool requirements. Since the breadth of the single rail construction is smaller, there is less chance for canting or skewing of the nut because its load can be mounted closer to the axis α. Circular loads can also be attached to the nut 44.

While this invention has been particularly shown and described with references to preferred embodiments thereof, it will be understood by those skilled in the art that various changes in form and details may be made therein without departing from the scope of the invention encompassed by the appended claims.

What is claimed is:

1. An anti-backlash nut assembly on a reinforced lead screw comprising in combination:

a threaded lead screw rotatable about a central axis;

a hollow, elongated reinforcing rail extending lengthwise of and surrounding the lead screw, the reinforcing rail having a slot extending lengthwise of the central axis;

an anti-backlash nut assembly having a nut moveable along the reinforcing rail, the anti-backlash nut having a pair of separate nut portions;

each nut portion having a tongue extending radially through the slot and having threads engagable with the threads of the lead screw for moving both nut portions in reciprocating motion lengthwise of the rail when the screw is rotated; and a spacing mechanism for forcing the nut portions apart to urge the flanges of their threads into forcible engagement with the threads of the lead screw to prevent backlash while the anti-backlash nut translates laterally along the reinforcing rail.

2. An anti-backlash nut assembly on a reinforced lead screw according to claim 1, wherein the spacing mechanism is rotatably carried by one of the nut portions and threadably engaging the other nut portion.

3. An anti-backlash nut assembly on a reinforced lead screw according to claim 2 further comprising a lock nut carried by the other nut portion for engaging the spacing mechanism.

4. An anti-backlash nut assembly on a reinforced lead screw according to claim 2, wherein a hub is formed on each of the tongues and the threads which engage the threads of the lead screw are formed in the hubs.

5. An anti-backlash nut assembly on a reinforced lead screw according to claim 2, wherein the tongues are engagable with the sides of the slot to prevent rotation of the nut halves as they translate lengthwise of the lead screw.

6. An anti-backlash nut assembly on a reinforced lead screw comprising in combination:

a threaded lead screw rotatable about a central axis;

a hollow, elongated reinforcing rail extending lengthwise of and surrounding the lead screw, the reinforcing rail having a slot extending lengthwise of the central axis;

an anti-backlash nut assembly having a nut moveable along the reinforcing rail, the anti-backlash nut having a pair of separate nut portions;

each nut portion having a tongue extending radially through the slot and having threads engagable with the threads of the lead screw for moving both nut portions in reciprocating motion lengthwise of the rail when the screw is rotated; and an advancing collar for forcing the nut portions apart to urge the flanges of their threads into forcible engagement with the threads of the lead screw to prevent backlash while the anti-backlash nut translates laterally along the reinforcing rail.

7. An anti-backlash nut assembly on a reinforced lead screw according to claim 6, wherein the advancing collar is rotatably carried by a slip collar and threadably engaging the other nut portion, and the slip collar rotatably carried by one of the nut portions.

8. An anti-backlash nut assembly on a reinforced lead screw according to claim 7 further comprising a lock nut carried by the other nut portion for engaging the spacing mechanism.

9. An anti-backlash nut assembly on a reinforced lead screw according to claim 7, wherein a hub is formed on each of the tongues and the threads which engage the threads of the lead screw are formed in the hubs.

10. An anti-backlash nut assembly on a reinforced lead screw according to claim 7, wherein the tongues are engagable with the sides of the slot to prevent rotation of the nut halves as they translate lengthwise of the lead screw.

\* \* \* \* \*